United States Patent Office 2,784,140
Patented Mar. 5, 1957

2,784,140

EMULSIFIER COMPOSITION AND INSECTICIDAL EMULSIONS OBTAINED THEREWITH

Edward Broderick, Philadelphia, Pa., assignor to Rohm & Haas Company, Philadelphia, Pa., a corporation of Delaware No Drawing. Application November 3, 1954,
Serial No. 466,690

10 Claims. (Cl. 167—43)

The present invention is concerned with improved emulsifiers adapted to be used for the preparation of oil-in-water type of emulsions containing insecticides, herbicides and the like. The invention is particularly concerned with pastes or dispersions in oil of an emulsifier of alkaryl ether type which are stabilized in accordance with this invention by the addition of methanol.

By emulsifiers of alkaryl ether type is meant the well-known broad class of emulsifiers derived from phenols or naphthols by the introduction of alkyl groups to provide a hydrophobic component and solubilizing groups including at least one alkylene oxide unit which forms an ether linkage through the phenolic hydroxyl and provides a hydrophilic component in the molecule. Emulsifiers of this type have heretofore been pasted or dispersed in various proportions of an oil of hydrocarbon type. Such oily pastes or dispersions generally contain the emulsifier dissolved therein and may be shipped as such to the consumers such as insecticide formulators who add various insecticides or other types of active ingredients with or without additional hydrocarbon oil. These formulators may use, but more frequently sell, the insecticide-containing composition or the like as a spray concentrate which may be directly sprayed or first added to water to form an oil-in-water emulsion of the insecticide which can be then sprayed or otherwise applied by the ultimate consumer. The intermediate formulator who sells such a spray concentrate containing the insecticide may make up a large quantity of such concentrate early in the spring in anticipation of large sales thereof. However, it has been found that when chlorinated bicyclic terpenes are incorporated as the insecticide in such spray concentrates that the concentrate has insufficient stability to carry the concentrate over from one spring to that in the next year. Any unsold remainder at the end of the growing season of any given year must be discarded or reformulated with additional non-ionic emulsifier. It appears that the chlorinated bicyclic terpenes liberate hydrogen chloride which, in turn, apparently breaks ether linkages of the alkaryl ether type of emulsifier with reduction in efficiency of emulsification action and consequent loss or difficulty to the intermediate formulator or the ultimate user.

It has now been discovered that the addition of a small amount of methanol to the emulsifier composition in some way hinders the breakdown of the alkaryl ether type of emulsifier in the presence of the chlorinated bicyclic terpenes. The addition of from 5% to 35% of methanol by weight of the weight of alkaryl type of emulsifier has been found to prolong the stability of such emulsifier in the presence of the chlorinated bicyclic terpenes sufficiently to avoid the necessity to reformulate the chlorinated bicyclic terpene composition in order to provide the required emulsifiability at the time of the growing season following that for which the concentrate was originally prepared. The stability of this type of composition containing the emulsifier, the chlorinated bicyclic terpene and oil may be determined more rapidly by the conventional "accelerated storage stability" test according to which the composition is stored at 60° C. until a sample thereof gives an emulsion in water which shows separation of oil within two hours standing at normal conditions of room temperature. This is indicative of breakdown of proper emulsification capacity. Such compositions normally show breakdown within a period of 3 to 8 weeks at 60° C. whereas after the addition of methanol, they generally show no breakdown within 14 to 15 weeks at 60° C. and may last considerably longer in certain cases.

While other alcohols including ethanol, propanol, and isopropanol have also been tried, they show practically negligible improvement in the stability of this type of composition.

In its simplest terms, the invention involves the addition of methanol in the proportion just stated to the emulsifier or to the paste, solution, or dispersion of the emulsifier in oil to form what may be termed an emulsifier composition which may be shipped to the formulator or user, who, in turn, may add additional oil and/or the insecticide or the other active ingredient. The invention contemplates the use of a single emulsifier of the alkaryl ether type or a mixture of one or more specific alkaryl ether emulsifiers with other emulsifiers such as the various anionic sulfates or sulfonates mentioned more particularly hereinafter.

The concentrated emulsifier paste or dispersion may contain from 2% to 15% or more of the hydrocarbon oil plus the appropriate proportion of methanol in addition to the emulsifier or mixture of emulsifiers comprising at least one of the alkaryl ether type. The use of such a small proportion of a hydrocarbon oil is advisable for the saving of freight when the emulsifier composition is to be shipped to a formulator or to the ultimate user. However, the emulsifier composition may contain more than 15% of hydrocarbon oil when shipping costs are of no concern. Thus, a spray concentrate may be produced containing from 20% to 90% of the hydrocarbon oil, 6% to 10% of one or more emulsifiers, 4% to 60% of an insecticide, particularly the chlorinated bicyclic terpene, and an amount of methanol equal to 5% to 35% by weight of the aryl ether type of emulsifier in the composition. Such a composition may be sprayed directly or it may be introduced into water in which it immediately emulsifies with mild agitation and then it may be sprayed or otherwise applied.

The alkaryl ether type of emulsifier may be those derived from the hydrocarbon-substituted phenols or naphthols which are reacted with an alkylene oxide, such as ethylene oxide, propylene oxide or butylene oxide, and preferably ethylene oxide. The compounds which are described in U. S. Patent 2,213,477 are generally of this type and may be used. Typical compositions are those of a tert-octylphenol reacted with from 8 to 20 ethylene oxide units, dodecylphenol reacted with from 8 to 20 ethylene oxide units and octadecylphenol reacted with from 8 to 20 ethylene oxide units.

Representative emulsifiers of the alkaryl ether type contemplated by the present invention include those of formulas I, II, and III.

I

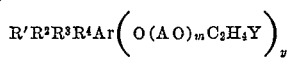

II   $R'R^2R^3ArCH_2(OC_2H_4)_mOR^5$

III

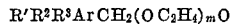

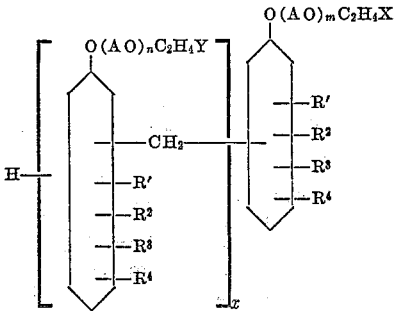

where Ar is a benzene or naphthalene nucleus, but is preferably a benzene nucleus, R' is a hydrocarbon substituent of at least 4 carbon atoms, and preferably of 8 to 18 carbon atoms, $R^2$ is H or a hydrocarbon substituent of 1 to 18 carbon atoms, $R^3$ is H or a hydrocarbon substituent of 1 to 18 carbon atoms, $R^4$ is H or a hydrocarbon substituent of 1 to 18 carbon atoms, $R^5$ is H or an alkyl group of 1 to 4 carbon atoms or —$CH_2ArR'R^2R^3$, A is an alkylene group of 2 to 4 carbon atoms and preferably ethylene, Y is OH, —$SO_3M$, —$PO_3M$, —COOM, or —OCO—$R^6$—$(COOM)_2$, where M is an alkali metal or an alkaline earth metal of group II, e. g., Be, Mg, Ca, Ba, and Sr, and $R^6$ is an alkyl or aryl radical of 1 to 7 carbon atoms, $m$ is 0 or an integer from 1 to 20 and is preferably at least 7, $n$ is 0 or an integer from 1 to 20 and is preferably at least 7, $x$ is an integer having a value of 1, 2, 3, or more, $y$ is 1 to 5 but is preferably 1.

The compounds of Formula I include those of U. S. Patent 2,213,477 mentioned above. The compounds of Formula II include those of U. S. 2,596,091; 2,596,092; and 2,596,093. Formula III includes the compounds of Patents 2,454,541; 2,454,542; 2,454,543; 2,454,544; 2,454,545; and 2,504,064. Any of these compounds may be used separately or in combination in the emulsifiers of the present invention.

The oil or hydrocarbon oil mentioned above is intended to be limited to hydrocarbon liquors which boil within the range of 176° F. and 760° F. and are aromatic in nature or contain at least 15% of aromatic hydrocarbons boiling within the range of 176° F. and 760° F. One of the essential features of our invention resides in the use of oils or aromatic oils, as described above, in connection with two different types of surface-active agents, as hereinafter described. Typical examples of these hydrocarbon oils are benzene, toluene, xylene, monomethyl naphthalenes, dimethyl naphthalenes, trimethyl naphthalenes, tetramethyl naphthalenes, ethyl naphthalenes, pine oil and mixtures of oils containing these aromatic hydrocarbons. Likewise, petroleum fractions boiling within the above range which are aromatic in nature, containing at least 15% (and preferably 20%) aromatic hydrocarbons, may also be used, and the preferred source of these oils is from recycle stocks which have been cracked with the aid of catalyst, such as those containing silica and alumina. The preferred boiling range of the oils used in our invention is between 176° and 570° F. Illustrative examples of petroleum hydrocarbon fractions which may be used are as follows:

|  | Oil A | Oil B | Oil C | Oil D |
|---|---|---|---|---|
| (1) A. P. I. Gravity at 60° F | 22.5 | 13.9 | 12.3 | 24.3 |
| (2) Initial Boiling Point (° F.) | 360 | 455 | 500 | 385 |
| (3) 50% Boiling Point (° F.) | 418 | 487 | 528 | 428 |
| (4) 90% Boiling Point (° F.) | 450 | 505 | 550 | 475 |
| (5) End Boiling Point (° F.) | 465 | 520 | 565 | 505 |

Another group of aromatic oils which have proven very effective in the making of our concentrates is as follows:

|  | Oil E | Oil F | Oil G |
|---|---|---|---|
| (1) A. P. I. Gravity at 60° F | 11.5–13.5 | 10.5–12.5 | 3.5–8.5 |
| (2) Initial Boiling Point (° F.) | 440–450 | 480–495 | 520–540 |
| (3) 50% Boiling Point (° F.) | 480–490 | 520–535 | 610–630 |
| (4) 90% Boiling Point (° F.) | 500–510 | 540–555 | 690–710 |
| (5) End Boiling Point (° F.) | 515–520 | 550–565 | 700–725 |

Oil E is composed of at least 75% to 80% dimethyl naphthalenes, oil F contains at least 75% to 80% trimethyl naphthalenes and oil F contains at least 75% to 80% tetramethyl naphthalenes. These oils may be prepared by mixing the corresponding alkyl-substituted naphthalenes with other petroleum hydrocarbons, or they may be separated as cuts from hydrocarbon oil fractions high in alkyl-substituted naphthalenes.

As mentioned above, the emulsifier may also contain strictly anionic types, such as alkylaryl sulfonates of which the alkali metal or alkaline earth metal of group II (e. g. beryllium, magnesium, calcium, barium and strontium) salts of dodecylbenzene sulfonic acid, dodecyltoluene sulfonic acid, dodecylxylene sulfonic acid or dodecylnaphthalene sulfonic acid. Also the alkali metal or alkaline earth metal salts of fatty alcohol sulfates such as lauryl alcohol sulfate, stearyl alcohol sulfate, and the sulfonates or sulfates of long-chain unsaturated aliphatic hydrocarbons, such as sulfonated castor oil, may be used.

The insecticides which may be incorporated in the oil-emulsifier composition include any chlorinated polycyclic terpenes such as 1,2-dihydroxy-4,5,6,7,8,8-hexahalo-4,7-methano-3a,4,7,7a-tetrahydroindane of U. S. Patent 2,528,654; the chlorinated pinene of U. S. 2,579,296; the chlorinated camphane of U. S. 2,579,297; the chlorinated camphene of U. S. 2,565,471; the chlorinated bornyl chloride of U. S. 2,579,298; the chlorinated isobornyl chloride of U. S. 2,579,299; the chlorinated pinane of U. S. 2,579,300; the chlorinated fenchene of U. S. 2,579,301; the chlorinated camphor and fenchone of U. S. 2,657,164.

The oil composition, as pointed out above, containing the emulsifier, the oil, the methanol, and the insecticide may be sprayed directly for insecticidal purposes, for which purpose generally a concentration of 2% to 10% and preferably 5% of the chlorinated bicyclic terpene may be used. When such a spray concentrate is introduced into water to produce an oil-in-water emulsion, the proportions may be such as to provide an emulsion containing from 0.05 to 10% or more of the insecticide. The emulsion may then be sprayed or otherwise applied at this concentration.

The addition of methanol to the emulsifier composition containing a small amount of the hydrocarbon oil solvent together with the emulsifiers generally is accompanied by incidental advantages. In the first place, the methanol lowers the viscosity of the concentrated emulsifier composition making it more easily handled and more easily measured for dosing. Secondly, it may serve as a blending or coupling agent, particularly when the emulsifying material comprises a plurality of different types of emulsifying agents.

The following examples are illustrative of the invention:

*Example 1*

Seven parts by weight of a predominantly aromatic solvent naphtha is mixed with 60 parts by weight of a tert-octylphenoxypolyethoxyethanol having an average of about 10 ethylene oxide units per molecule and 9 parts by weight of methanol are added as a stabilizer for the emulsifier.

Example 2

Eight parts by weight of the oil of Example 1 are mixed with 40 parts by weight of the di-sec-amylphenol (which has been condensed with formaldehyde in a mole ratio of 2 of the phenol to 1 of the formaldehyde and reacted with ethylene oxide to provide an average of about 10 moles of the ethylene oxide in the molecule). Then 10 parts by weight of methanol are added to provide a stabilizer for the emulsifier.

Example 3

To the composition of Example 2, 16 parts by weight of the emulsifier of Example 1 are added and also 26 parts by weight of a calcium salt of dodecyltoluene sulfonate wherein a small proportion of unsulfonated oils may also be present as is common in such commercial products.

The concentrates of Examples 1, 2, and 3 are emulsifiers which may be shipped to formulators who may use them as emulsifiers to produce many compositions including herbicidal compositions as well as insecticidal compositions. With insecticidal materials of the chlorinated bicyclic terpene type, the methanol therein hinders the breakdown of the alkaryl ether type of emulsifier in the presence of the hydrogen chloride liberated by the bicyclic terpene as pointed out hereinbefore. In compounding the emulsifiers of Examples 1, 2, and 3 with insecticides or other active agents, additional oil solvent may be added. The resulting composition may be formulated for direct spraying or for self-emulsification in water to provide a spray material.

Example 4

An emulsifiable concentrate is prepared by mixing 90 parts by weight of a hydrocarbon oil boiling substantially between 450 and 520° F. and composed primarily of aromatic hydrocarbons, 5 parts by weight of dodecylbenzene sodium monosulfonate, 5 parts by weight of a condensation product of one mole of octylphenol and about 12 moles of ethylene oxide, 5 parts by weight of the chlorinated camphane of U. S. Patent 2,579,297, and 0.3 part by weight of methanol. The composition thus obtained may be sprayed as such. Preferably it is added to water in which it is self-emulsifiable in almost any proportion desired, producing a long-lasting oil-in-water emulsion which is sprayable.

Example 5

Sixty parts by weight of an oil boiling substantially between 440° and 520° F. and composed primarily of dimethylnaphthalene and a small amount of naphthalene hydrocarbons, 5 parts by weight of an alkyl-substituted benzene sodium monosulfonate wherein the alkyl chain contains from 10 to 14 carbon atoms, 5 parts by weight of a condensation product of one mole of diamylphenol and an average of 10 moles of ethylene oxide, 5 parts by weight of the chlorinated pinane of U. S. Patent 2,579,300, and one part by weight of methanol are mixed to form an emulsifiable insecticidal concentrate. This concentrate may be mixed with water in a great variety of proportions for the formation of an oil-in-water emulsion containing from 1 to 10% by weight of the insecticidal material.

Example 6

A similar composition is prepared replacing the condensation product of diamylphenol and ethylene oxide with the condensation product of one mole of dihexylphenol with an average of 12 moles of ethylene oxide.

It is to be understood that changes and variations may be made without departing from the spirit and scope of the invention as defined in the appended claims.

I claim:

1. An emulsifier composition comprising a hydrocarbon oil solvent containing at least 15% of aromatic hydrocarbons boiling within the range of 176° F. and 760° F., an alkaryl ether type of emulsifier having the hydrophobic component linked to a hydrophilic component through an ether oxygen connected directly to an aryl nucleus, and methanol in an amount of 5% to 35% by weight of the ether type of emulsifier.

2. An emulsifier composition comprising a hydrocarbon oil solvent containing at least 15% of aromatic hydrocarbons boiling within the range of 176° F. and 760° F., emulsifying material comprising an alkaryl ether type of emulsifier selected from the group consisting of compounds of Formulas I, II, and III as defined in the specification, and methanol in an amount of 5% to 35% by weight of the ether type of emulsifier.

3. A composition as defined in claim 2 in which the emulsifying material comprises an alkylphenoxypolyethoxyethanol having at least eight oxyethylene units and in which the alkyl group has from 8 to 18 carbon atoms.

4. An emulsifier composition comprising 2% to 15% of a hydrocarbon oil solvent containing at least 15% of aromatic hydrocarbons boiling within the range of 176° and 760° F., emulsifying material comprising an alkaryl type of emulsifier selected from the group consisting of compounds of Formulas I, II, and III as defined in the specification, and methanol in an amount of 5% to 35% by weight of the ether type of emulsifier.

5. An insecticidal composition comprising 20% to 90% by weight of an oil solvent essentially consisting of hydrocarbons boiling within the range of 176° F. and 760° F. of which at least 15% are aromatic, 6% to 10% by weight of emulsifying material comprising at least one alkaryl ether type of emulsifier selected from the group consisting of compounds of Formulas I, II, and III as defined in the specification, methanol in an amount of 5% to 35% by weight of the total alkaryl ether component of the emulsifying material, and 4% to 60% by weight of a chlorinated bicyclic terpene.

6. An insecticidal composition comprising 20% to 90% by weight of an oil solvent essentially consisting of hydrocarbons boiling within the range of 176° F. and 760° F. of which at least 15% are aromatic, 6% to 10% by weight of emulsifying material comprising at least one alkaryl ether type of emulsifier selected from the group consisting of compounds having the structure of Formula I, methanol in an amount of 5% to 35% by weight of the total alkaryl ether component of the emulsifying material, and 4% to 60% by weight of a chlorinated bicyclic terpene.

7. An insecticidal composition comprising 20% to 90% by weight of an oil solvent essentially consisting of hydrocarbons boiling within the range of 176° F. and 760° F. of which at least 15% are aromatic, 6% to 10% by weight of emulsifying material comprising at least one alkaryl ether type of emulsifier selected from the group consisting of compounds having the structure of Formula II, methanol in an amount of 5% to 35% by weight of the total alkaryl ether component of the emulsifying material, and 4% to 60% by weight of a chlorinated bicyclic terpene.

8. An insecticidal composition comprising 20% to 90% by weight of an oil solvent essentially consisting of hydrocarbons boiling within the range of 176° F. and 760° F. of which at least 15% are aromatic, 6% to 10% by weight of emulsifying material comprising at least one alkaryl ether type of emulsifier selected from the group consisting of compounds having the structure of Formula III, methanol in an amount of 5% to 35% by weight of the total alkaryl ether component of the emulsifying material, and 4% to 60% by weight of a chlorinated bicyclic terpene.

9. A composition as defined in claim 5 in which the emulsifying material comprises an alkylphenoxypolyethoxyethanol having at least eight oxyethylene units in which the alkyl group has from 8 to 18 carbon atoms.

10. A composition as defined in claim 6 in which the terpene is camphane.

References Cited in the file of this patent

UNITED STATES PATENTS

| | | |
|---|---|---|
| 2,426,214 | Hewes | Aug. 26, 1947 |
| 2,596,093 | De Benneville | May 13, 1952 |